United States Patent Office 3,336,907
Patented Aug. 22, 1967

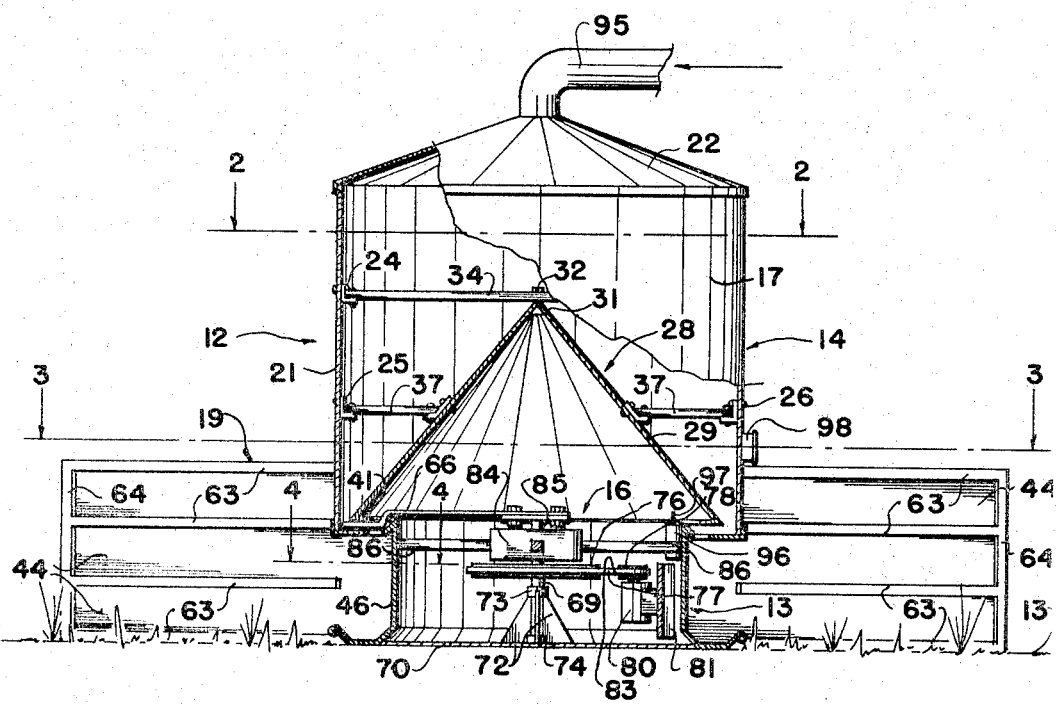

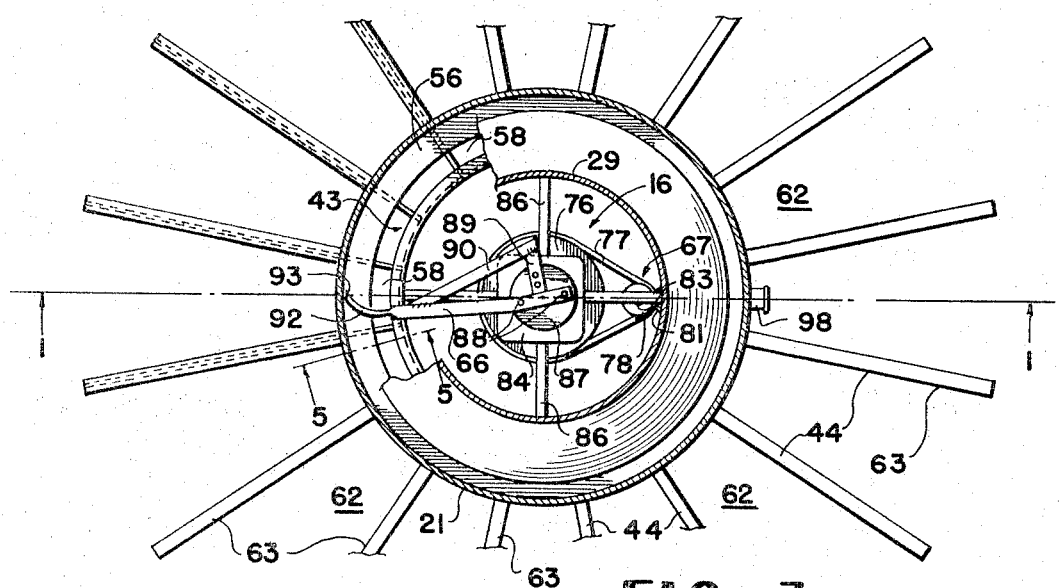
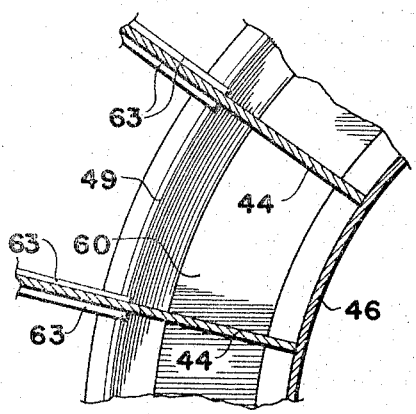
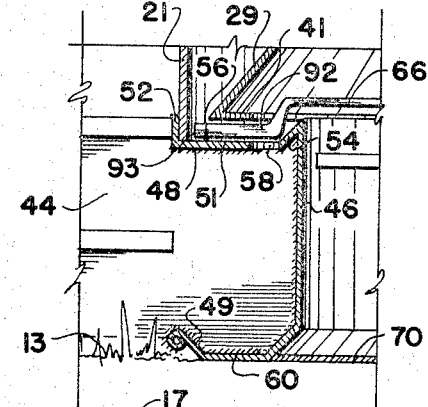
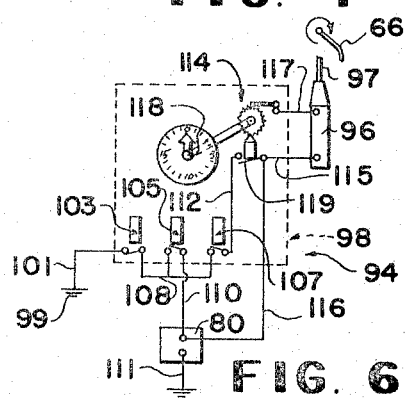

3,336,907
LIMITED ACCESS LIVESTOCK FEEDER APPARATUS
Andy L. Thompson, R.R. 2, Courtland, Kans. 66939
Filed Mar. 7, 1966, Ser. No. 532,321
7 Claims. (Cl. 119—56)

ABSTRACT OF THE DISCLOSURE

An animal feeder including a hopper, dispenser and trough, and motor means for actuating the dispenser to deliver feed material to the trough. Partition means divide the trough and provide feed stalls about the hopper.

---

This invention relates to a feeder apparatus, and more particularly, to a feeder apparatus used to dispense a regulated amount of forage or the like into a plurality of feeding stalls. Still more specifically, the invention relates to an automatic feeder apparatus for use in feeding pigs and the like having a storage housing and dispensing means operable to discharge a pre-determined equal amount of forage about the periphery of the housing into separate feeding stalls.

There are numerous livestock feeder devices known to the prior art operable to convey forage and the like from a storage container to a livestock feeding area. However, these prior art feeding devices are normally expensive to manufacture, complicated in structure, costly to maintain, and unreliable in operation. It is desirable in an automatic feeding device to provide for a constant even discharge of feed to a plurality of separated livestock with a minimum of moving parts and human effort.

In accordance with the present invention, new means to distributing feed such as forage, to a plurality of livestock has been provided which overcomes many of the above-mentioned disadvantages of the prior art devices.

In a preferred specific embodiment of the invention, the new feeder apparatus of this invention includes a container means mounted on a partition and support assembly which has a plurality of spaced, vertically extended partition wall members secured as by welding to a central hub assembly. The partition wall members form a plurality of spaced identical feeding areas or stalls about the periphery of the hub assembly and the container means. The lower end portion of the container means is supported on a top wall of the hub assembly that extends inwardly therefrom and is integral with an upstanding support wall. The top wall has a feed receiving section adjacent the circumferential sidewall and a plurality of evenly spaced discharge openings inwardly therefrom adjacent the upstanding support wall. The lower edge of the support wall is integral with an outwardly laterally extended bottom wall which cooperates with the partition wall members to form feeding troughs in the stalls.

Above the top wall and centrally of the container means is mounted a downwardly open deflector cone member having its outer lower edges spaced inwardly and adjacent corresponding adjoining portions of the sidewall and the top wall. It is seen, therefore, that the cone member acts to direct forage within the housing means outwardly and downwardly to be supported on the receiving section of the top wall. The forage is moved inwardly by an arm member driven by a power means to revolve the same about the center of the container means while extended transversely of the top wall. The slowly revolving arm member acts to progressively move the forage inwardly on the top wall for movement through the discharge openings into the individual feeding stalls. A control means is operable to selectively rotate the arm member a pre-selected number of revolutions to achieve an even, constant, distribution of a desired amount of forage to the feeding stalls.

Accordingly, it is an object of this invention to provide a new and novel feeder apparatus.

Another object of this invention is to provide a feeder apparatus having means for evenly distributing forage and the like to a plurality of livestock feeding stalls.

Still another object of this invention is to provide a feeder apparatus having a storage or container means, means for directing forage within the container means to an intermediate support position, and means for picking up and moving the forage from the intermediate position to a plurality of spaced livestock feeding stalls.

One other object of this invention is to provide a feeder apparatus having means for automatically transferring a pre-selected amount of forage from a storage container to each of a plurality of livestock stalls.

Still, one other object of this invention is to provide a feeder apparatus having a forage storage container and means mounted within the storage container for automatically transferring a pre-selected amount of forage outwardly and evenly about the periphery of the storage container for consumption by a plurality of livestock spaced thereabout.

Yet another object of this invention is to provide a feeder apparatus that is inexpensive to manufacture, simple to use, and not costly to operate.

Various other objects, advantages and features of the invention will become apparent to those skilled in the art from the following discussion taken in conjunction with the accompanying drawings, in which:

FIG. 1 is an elevational view of a feeder apparatus of this invention illustrated with a portion thereof broken away for clarity;

FIG. 2 is a fragmentary sectional view taken along line 2—2 in FIG. 1;

FIG. 3 is a fragmentary sectional view taken along line 3—3 in FIG. 1 illustrated with portions thereof broken away for the purpose of clarity;

FIG. 4 is an enlarged fragmentary sectional view taken along line 4—4 in FIG. 1;

FIG. 5 is an enlarged fragmentary sectional view taken along line 5—5 in FIG. 3;

FIG. 6 is a circuit diagram of a control means of the feeder apparatus of this invention; and FIG. 7 is a schematic diagram showing the operation of the feeder apparatus of this invention.

The following is a discussion and description of preferred specific embodiments of the new feeder apparatus of the invention, such being made with reference to the drawings, whereupon the same reference numerals are used to indicate the same or similar parts and/or structure. It is to be understood that such discussion and description is not to unduly limit the scope of the invention.

Referring to the drawings and particularly to FIG. 1, the feeder apparatus of this invention, indicated generally at 12, is shown supported on a ground surface 13. The feeder apparatus 12 includes a storage and stall assembly 14 and a conveyor mechanism 16 mounted centrally thereof and operable to distribute forage and the like to livestock about its periphery. As shown in FIGS. 1 and 2, the storage and stall assembly 14 includes a silo-like container means 17 elevated above the ground surface 13 and supported on a partition assembly 19. The container means 17 has a cylindrically shaped upstanding sidewall 21 having the upper end interconnected by a roof 22 and the lower end vertically supported on and held against lateral movement by the partition assembly 19. Intermediate the roof 22 and the partition assembly 19, the sidewall 21 is reinforced by a pair of vertically spaced circumferentially extended angle iron members 24 and 25 secured as by bolts 26 to the inner surface of the sidewall 21. The container means 17 further includes a deflector means 28 having a large cone member 29 open downwardly and centrally positioned relative to the sidewall 21. The cone member 29 has an apex 31 which is secured as by a bolt 32 to a pair of crossed angle members 34 having opposite ends carried on diametrically opposed portions of the upper angle iron member 24 and secured thereto as by bolts 35.

For rigidity of the deflector means 28, between the apex 31 and the lower edge of the cone member 29, a plurality of spaced support ribs 37 are radially extended between the angle iron member 25 and the sidewall 21. Each support rib 37 has one end bolted to the angle iron member 25 and the opposite secured as by bolts 38 to an angularly inclined bracket 39 bolted to the outer surface of the cone member 29. It is seen, therefore, that the cone member 29 is vertically supported by its connection to the crossed angle members 34 and held against lateral movements by the support ribs 37 to maintain the axis of the cone member 29 vertically extended and aligned with the center of the sidewall 21. The lower end of the cone member 29 is positioned adjacent and equally spaced from the sidewall 21 and has an integral flange 41 extended inwardly and horizontally for reasons to be explained.

It is seen, therefore, that except for the deflector means 28, the container means 17 resembles a conventional silo structure which is supported on the special partition assembly 19 instead of the ground surface 13.

As shown in FIGS. 1 and 5, the partition assembly 19 appears as a large spoke wheel having a central hub assembly 43 to which is welded a plurality of spaced, radially extended partition wall members 44. The hub assembly 43 includes a cylindrical support wall 46 having outwardly laterally extended integral top and bottom walls 48 and 49, respectively. The top wall 48 is of an irregular shape in transverse cross section having a horizontally extended body section 51 integral with an outer vertical flange section 52 and an upwardly inclined inner wall section 54 integral with the support wall 46. The body section 51 has an outer material receiving portion 56 and a plurality of radially spaced discharge openings 58 positioned adjacent the support wall 46. The bottom wall 49 is similar in shape and size to the top wall 48 except having a support section 60 resting on the ground surface 13 adapted to receive forage fed through the discharge openings 58 as will be explained.

The inner edges of the partition wall members 44 are of similar profile as the outer surface of the support wall 46 in transverse cross section so as to fit in nesting engagement therewith. (FIG. 5.) The partition wall members 44 are welded thereto for vertical stability so as to form a plurality of substantially equal sized feeding stalls 62 about the outer periphery of the support wall 46. The partition wall members 44 have upper sections extended above and outwardly of the top wall 48 which can be welded to the sidewall 21 of the container means 17 for added stability. Additionally, a plurality of spaced, horizontally extended bars 63 are welded to opposite sides of each of the partition wall members 44 and interconnected at the outer ends by vertical bar 64 to make the partition wall members 44 rigid and self supporting. It is seen, therefore, that the hub assembly 43 has a plurality of feeding stalls 62 about its outer periphery whereupon livestock, such as cows, horses, pigs, and the like can individually move into one of the stalls 62 and feed off the bottom wall 49 which acts as a feeding trough.

In order to move forage from within the container means 17 into the feeding stalls 62, the conveyor mechanism 16 is mounted centrally of the hub assembly 43, and includes a rotatable collector means or arm member 66 driven by a power means 67. As shown in FIG. 1, the power means 67 includes an upright intermediate shaft 69 vertically supported on a horizontal plate 70 extended between and welded to the inner edges of the bottom wall 49 of the hub assembly 43. A plurality of gusset plates 72 are welded to and extended between the plate 70 and spaced bearing members 73 and 74 which are mounted about the intermediate shaft 69 permitting relative rotation thereof. The gusset plates 72 operate to give substantial lateral stability to the intermediate shaft 69. Upwardly of the bearing member 73 is a driven pulley 76 rigidly secured to the intermediate shaft 69 and interconnected by a belt member 77 to a drive pulley 78. A motor 80 secured to a mounting bracket 81 which in turn is rigidly attached to the inner surface of the support wall 21, has a vertical drive shaft 83 to which is secured the drive pulley 78. It is obvious that energization of the motor 80 results in rotation of the intermediate shaft 69 through the drive pulley 78, the driven pulley 76, and the belt member 77.

The uppermost end of the intermediate shaft 69 is interconnected through a plurality of gear members (not shown) in a conventional transmission means 84 to an output power shaft 85. The transmission means 84 operates to transform the high speed, low torque input from the drive shaft 83 via the intermediate shaft 69 into a low speed, high torque rotation of the output power shaft 85 for reasons to become obvious. A plurality of support struts 86 secured to the transmission means 84 and connected to the support wall 46 gives substantial lateral stability to the power means 67.

The upper end of the output power shaft 85 is secured as by welding to the center of a circular connector plate 87 extended transversely and horizontally of the shaft axis. To the top surface of the connector plate 87 is secured the inner end of the arm member 66 by a pair of bolts 88. A pair of interconnected support bars 89 and 90 are bolted to the connector plate 87 and welded to the arm member 66, respectively, for added rigidity. The arm member 66 is formed from a rectangular bar member bent into an irregular shape having an outer working section 92 stepped downwardly and curved forwardly. The working section 92 extends between the top wall 48 of hub assembly 43 and the lower end of the cone member 29 so as to lie transversely of the body section 51. The working section 92 has an outer working tip 93 that lies adjacent the sidewall 21 of the container means 17. The working section 92 curves inwardly across both the material receiving portion 56 and the discharge openings 58 for reasons to become obvious.

In the use and operation of the feeder apparatus 12 of this invention, the container means 17 is maintained supplied with forage or the like by a conventional blower conveyor 95 as shown in FIG. 1. The forage is directed downwardly and outwardly under the force of gravity on the outer surface of the cone member 29 whereupon the lowermost forage is supported on the material receiving portion 56 of the top wall 48 of the hub assembly 43. As shown in FIG. 7, on energization of the motor 80, the arm member 66 slowly revolves about the common axes of the intermediate shaft 69 and the container means 17. The forage on the material receiving portion 56 is thereupon moved inwardly and rearwardly on the curved working section 92 of the arm member 66 into the discharge openings 58. The forage then falls under the force of gravity into the bottom wall 49 or feeding trough of the stalls 62 as the arm member 66 revolves. It is obvious that the motor 80 is de-energized when a sufficient amount of forage has been dispensed into the feeding stalls 62 from the container means 17.

The spaced relationship of the body section 51 of the top wall 48 to the flange 41 of the cone member 29 serves an important function in controlling inward movement of the forage. The distance therebetween is only slightly larger than the vertical height of the working section 92 of the arm member 66 thereby preventing the forage from climbing over the working section 92 instead of moving inwardly to the discharge openings 58.

In order to provide for automatic, even distribution of a controlled amount of forage into the feeding stalls 62 a control means 94 is connected to the motor 80. The control means 94 includes a conventional counter 96 mounted on the inner support wall 46 of the hub assembly 43 having an upwardly extended feeler 97 engageable with the arm member 66 to count its revolutions and transmit an impulse indicative of each revolution into a master control switch 98. The master control switch 98 can be mounted in any convenient location and is illustrated as secured to an outer surface of the sidewall 21 of the container means 17 so as to be readily available to an operator.

As shown in FIG. 6, the master control switch 98 is connected from a power source 99 by a line 101 to one terminal of a normally closed "OFF" button 103. The master control switch 98 further includes a "MANUAL" button 105 and an "AUTOMATIC" button 107, both of which are normally open. One terminal of the buttons 105 and 107 are connectible to the power source 99 through a conductor line 108 connected to the other terminal of the "OFF" button 103. The other terminal of the "MANUAL" button 105 is connected by a line 110 to the motor 80 when in a closed position. The motor 80 is in turn grounded by a line 111. The other terminal of the "AUTOMATIC" button 107 is connectible by a line 112 to a counter mechanism 114 which in turn is connected by a line 115 to the counter 96. The counter 96 in turn transmits the impulses from actuation of the feeler 97 on revolution of the arm member 66 by a conductor line 117 to the conventional ratchet counter mechanism 114 within the master control switch 98. When the ratchet counter mechanism 114 is actuated, the motor 80 is energized through a line 116.

In the use and operation of the feeder apparatus 12 with the control means 94, the "MANUAL" button 103 can be depressed to energize the motor 80 through the lines 101, 108, and 110 until de-energized on actuation of the "OFF" button 103 which releases the "MANUAL" button 105. The buttons are all interconnected by a conventional latch bar or held in the depressed position by solenoids whereby actuation of one button automatically releases any of the other buttons which are at that time depressed. It is obvious that the use of the "MANUAL" button 105 actuates the feeder apparatus 12 to dispense forage as previously described.

On use of the automatic dispensing system, the master control switch 98 has a selector knob 118 which is rotatable clockwise, as viewed in FIG. 6, to close a switch 119 and pre-select a desired number of revolutions of the arm member 66. The "AUTOMATIC" button 107 is then depressed to energize the motor 80 through the lines 101, 108, 112 and 116. Simultaneously, the counter 96 is energized through the line 115 to transmit impulse to the ratchet counter mechanism 114 on each actuation of the feeler 97 caused by a revolution of the arm member 66. After the pre-selected number of revolutions, the ratchet counter mechanism 114 opens the switch 119 to de-energize the motor 80. It is seen, therefore, that the control means 94 is operable to pre-select the number of revolutions of the arm member 66 whereby a desired amount of forage is automatically dispensed into the feeding stalls 62. The resistance of the forage to the high torque, slow speed of the arm member 66 is sufficient to immediately stop movement of the arm member 66 when the motor 80 is de-energized to assure that a controlled amount of forage is being dispensed.

Additionally, it is noted that the "OFF" button 103 is operable at any time to completely de-energize the circuit of the control means 94 and, therefore, acts as a safety switch. Also, it would be obvious to one skilled in the art to add a timer mechanism to the control means whereby the feeder apparatus can be actuated at a preselected time each day to automatically dispense forage to feed the livestock.

It would be obvious to add plates or gates to the feeder apparatus operable to be selectively movable transversely of the discharge openings 58 and locked in these positions to prevent forage from being discharged into certain ones of the stalls 62. The gates would be opened and closed as required depending on the number of animals being fed at any particular time.

As will be apparent in the foregoing description of the preferred embodiment of applicant's feeder apparatus, relatively simple and inexpensive dispensing means has been provided which is reliable in use, inexpensive to manufacture, and simple to operate. Applicant's novel structure eliminates a great deal of time consuming and tedious work involved in feeding calves, pigs, and the like.

While the invention has been described in connection with preferred specific embodiments thereof, it will be understood that the description is intended to illustrate and not to limit the scope of the invention, which is defined by the following claims.

I claim:
1. A feeder apparatus for distribution of feed for feeding livestock, comprising:
  (a) a container means adapted to store the feed having an upstanding wall,
  (b) means for supporting said container means having a wall member extended inwardly and transversely of said upstanding wall and connected thereto,
  (c) means for directing feed in said container means toward the junction of said upstanding wall and said wall member,
  (d) said wall member having a receiving portion to support feed received from said directing means and a plurality of discharge openings adjacent said receiving portion,
  (e) distributing means having a collector member movable adjacent said wall member and transversely of said receiving portion and said discharge openings,
  (f) power means connected to said collector member operable to move said collector member adjacent said upstanding wall whereby the feed on said receiving portion is moved by said collector member toward and passed through said discharge openings for distribution of the feed,
  (g) said supporting means having a plurality of radially extended upstanding partition members extended laterally of said upstanding wall whereby feed is discharged through said discharge openings between pairs of said partition members.

2. A feeder apparatus as described in claim 1, wherein:
  (a) said partition members extended transversely of said upstanding wall with adjacent ones forming the feeding stalls, said partition members having upper edges secured to said wall member for elevation thereof above the supporting surface, and
  (b) each of said stalls having at least one of said discharge openings aligned therewith whereby the feed is discharged into said stalls for access thereto by the livestock.

3. A feeder apparatus as described in claim 1, wherein:
  (a) said collector member having a forwardly curved outer end portion whereby the forage is directed inwardly and rearwardly by said end portion into said discharge openings,
  (b) said wall member positioned adjacent said directing means cooperating with said collector member to guide the feed inwardly,
  (c) said discharge openings adjacent each other separated by said upright partition members only thereby assuring complete discharge of the forage therethrough.

4. A feeder apparatus as described in claim 1, including:

(a) control means operably connected to said power means having a counter means, a master switch member, and circuit means interconnecting said power means, said counter means and said master switch member whereby said master switch member is actuated to revolve said arm member and said counter means is operable with said master switch member to de-energize said power means after a pre-selected number of revolutions of said arm member to discharge a pre-determined amount of feed.

5. A feeder apparatus as described in claim 4, wherein:
(a) said counter means having a feeler member engageable by said arm member on each revolution thereof whereby an impulse is transmitted to said master switch member to de-energize said power means after a pre-selected number of impulses.

6. A feeder apparatus as described in claim 1, wherein:
(a) said supporting means having an upstanding support wall having the upper ends integral with said wall member and the lower end integral with a bottom wall,
(b) said bottom wall positioned below said discharge openings adapted to receive forage therefrom to form feed troughs, and
(c) said support wall secured to a plurality of radially extended partition wall members forming feeding stalls each having feed trough accessible by an individual one of the livestock.

7. A feeder apparatus as described in claim 1, including:
(a) control means operably connected to said power means to revolve said arm member a pre-determined number of revolutions to discharge a pre-determined amount of feed therefrom.

References Cited
UNITED STATES PATENTS
| | | | |
|---|---|---|---|
| 920,597 | 5/1909 | Mallett | 222—330 |
| 2,574,231 | 11/1951 | Sinden | 222—227 |
| 3,191,577 | 6/1965 | McMurray | 119—16 |

FOREIGN PATENTS
| | | |
|---|---|---|
| 1,238,361 | 7/1960 | France. |

SAMUEL KOREN, *Primary Examiner.*

HUGH R. CHAMBLEE, *Examiner.*